June 4, 1935.  E. L. CANFIELD  2,003,919
METER
Filed Sept. 16, 1933
Fig. 1.
Fig. 2.
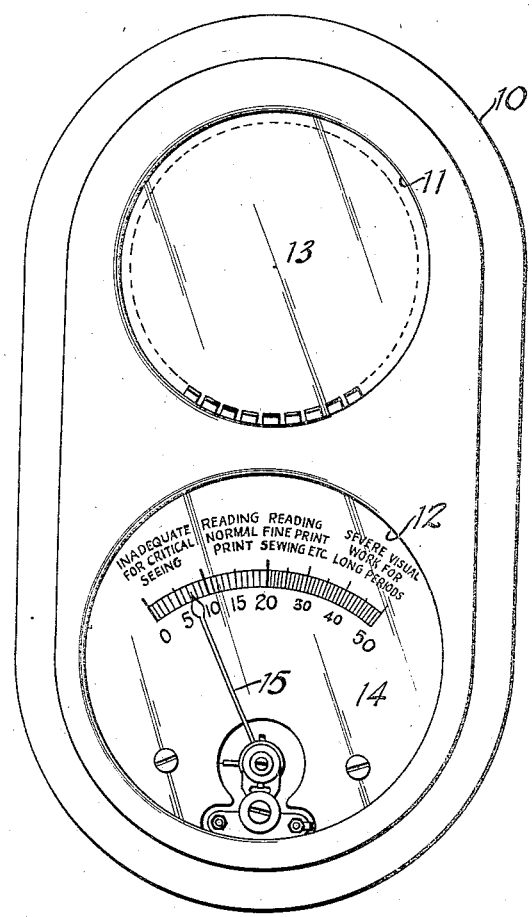
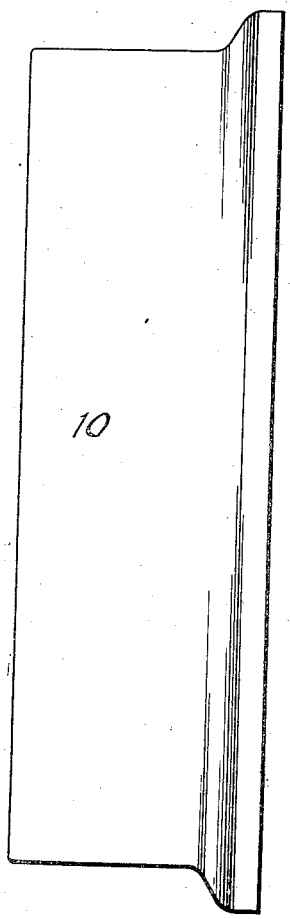
INVENTOR
EARL L. CANFIELD.
BY
ATTORNEY Patented June 4, 1935

2,003,919

UNITED STATES PATENT OFFICE 2,003,919

METER

Earl L. Canfield, Hillside, N. J.

Application September 16, 1933, Serial No. 689,705

1 Claim. (Cl. 38—23)

The present invention relates to meters and is more particularly directed toward light sensitive meters adapted for measuring light and for simultaneously giving indications which may be understood by anyone showing the character of work which one's eye should be called upon to perform.

The ordinary foot candle meter is calibrated to give indications in foot candles, but these indications are meaningless to anyone except an expert who is accustomed to make determinations of light intensity and to interpret the same. For this reason determination of light intensities has been neglected by all except those particularly and necessarily interested in and understanding the technical subject. The neglect of this important matter has even extended to eye specialists where, notwithstanding the known relation of visual acuity to light intensity, it has been the universal practice to make eye examinations without the aid of any definite means of checking the light intensity employed.

The present invention contemplates a meter having a scale arranged so that it can readily be interpreted by the layman, so that by means of this instrument he can determine whether or not there is sufficient light for the character of work which he is called upon to do. He is, therefore, enabled to make certain that there is sufficient light for the visual task.

The accompanying drawing shows, for purposes of illustrating the present invention, one of the many embodiments in which the invention may take form, it being understood that the drawing is illustrative of the invention rather than limiting the same. In the drawing:

Figure 1 is an elevational view of a meter, and

Figure 2 is a side elevational view of the same.

The instrument may be embodied in a suitable case shown at 10. In the drawing, this case is of oval shape and has two openings 11 and 12 in the front face. The opening 11 is adapted to admit light to a batteryless photo-electric cell 13. This cell is connected with a milliammeter 14 visible through the opening 12 and connected in the customary manner with the batteryless photo-electric cell. The milliammeter has a pointer 15 movable to positions corresponding with the intensity of light falling on the photo-electric cell. This pointer moves over a scale such as shown in the drawing. This scale may be calibrated in foot candles, for example, from 0 to 50 foot candles. The scale also carries indications such as shown in the drawing, and reading as follows:

"Inadequate for critical seeing"
"Reading normal print"
"Reading fine print, sewing, etc."
"Severe visual work for long periods"

These indications are given by way of example as being the ones in the range for which the 50 foot candle meter would be used and readily understood by the layman. When less than 10 foot candles are available there is too little light for critical seeing. From 10 to 20 foot candles is the minimum satisfactory for normal reading; from 20 to 30 foot candles is the minimum for reading fine print and for sewing; and 30 to 50 foot candles is the minimum for severe visual tasks for long periods.

Where the meter is designed for use with high intensities additional indications may be employed suitable for the more difficult tasks, such as sewing on black, engraving, watch making and other tasks requiring such high intensities.

To indicate the inadequacy of the light for critical seeing at the low range, for example, below 10 foot candles, this indication is preferably printed in contrasting color, for example, red, while the other indications may be printed in black.

The present instrument makes it possible for anyone at any time to readily determine whether or not there is sufficient illumination for the particular task to be performed. In use the instrument is placed on a desk or table or held against the wall or in the hand in the position in which seeing tasks are to be performed, and it will directly indicate the amount of light which is available in the plane in which the instrument is held. The instrument is so small and compact that the entire area of the device is subject to substantially the same illumination. The cell itself and the indicating dial are of course in the upper front face of the instrument and the operating connections are to the rear of these elements. It also makes it possible for the eye specialist to conduct his examinations under known conditions, and to prescribe the minimum intensities which the patient should employ for visual tasks.

I claim:

A portable light meter having an opaque casing provided with two apertures in its front face, a scale visible through one aperture, the scale reading in foot candles and having alongside the foot candle indications the character of the task which the human eye should be called upon to perform when the light intensity equals the reading in foot candles adjacent the particular indication, a pointer movable over the scale, and a light cell behind the other aperture for actuating the pointer, the scale and light cell being in substantially the plane of the front face of the light meter whereby the intensity of light in a plane of reference may be determined.

EARL L. CANFIELD.